Feb. 16, 1937. W. C. TROUT 2,071,008
COMBINED BALANCE AND COUNTERBALANCE FOR CRANKSHAFTS
Filed Feb. 5, 1927

Walter C. Trout Inventor

By Jesse R. Stone
Attorney

Patented Feb. 16, 1937

2,071,008

UNITED STATES PATENT OFFICE 2,071,008

COMBINED BALANCE AND COUNTERBALANCE FOR CRANKSHAFTS

Walter C. Trout, Lufkin, Tex.

Application February 5, 1927, Serial No. 166,109

16 Claims. (Cl. 74—591)

My invention relates to an attachment for crank shafts adapted to reciprocate a load such as a pump rod and a plunger. It pertains particularly to a weight to be applied to the crank arm to balance the weight of the load being reciprocated and to also act as a balance for the shaft when the load is not being reciprocated.

My invention is adapted particularly for use on pumping equipment for deep wells but manifestly it is adapted for operation of any devices wherein a load is raised and dropped in the operation of the apparatus.

It is an object of the invention to provide a counterbalance weight which is capable of ready adjustment relative to the crank arm so as to vary the effect of the weight on the arm and to be moved into a position opposite the arm where it will have a balancing effect.

The invention resides in the particular structure and arrangement of parts whereby the adjustment of the position of the weight upon the crank may be easily performed.

Figure 2:
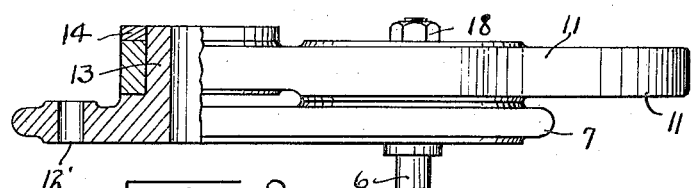
Figure 1:
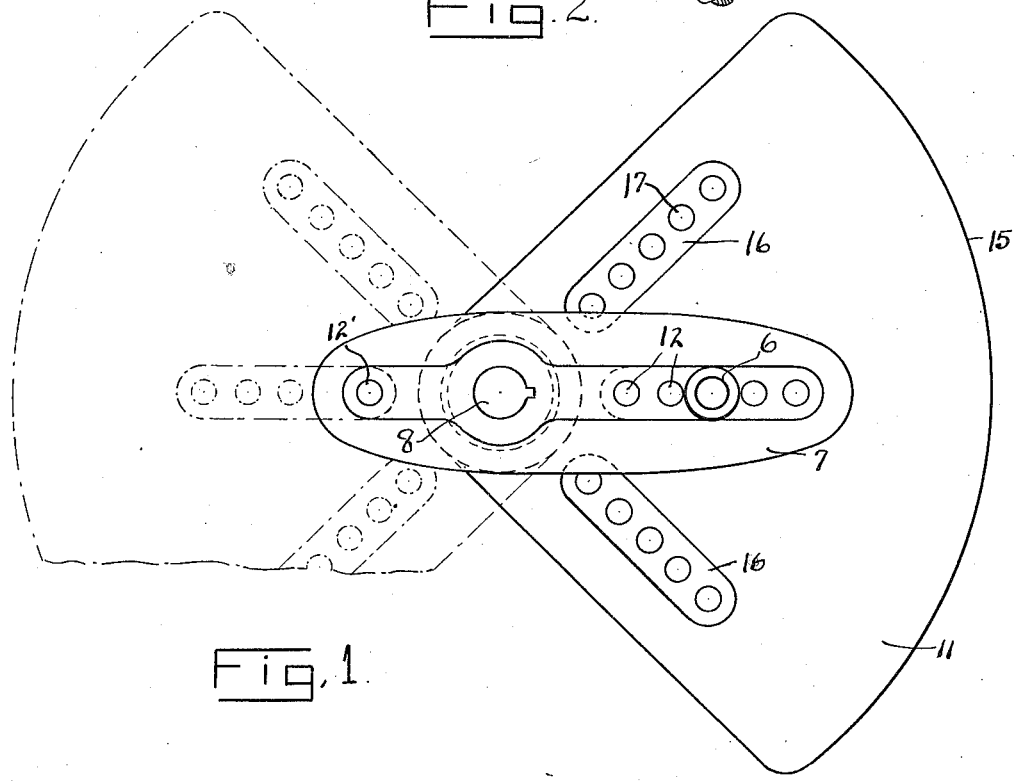
Figure 3:
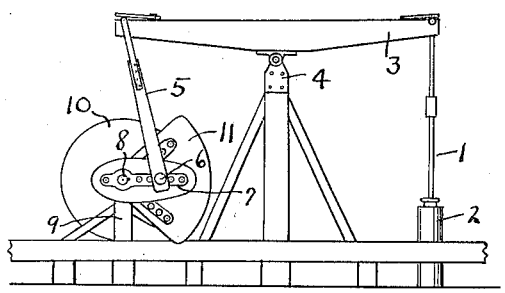

Referring to the drawing herewith, Fig. 1 is a side elevation of a crank arm upon a crank shaft and showing my counterbalance weight in position thereon. Fig. 2 is a top plan view of the crank arm and weight, certain portions being broken away for greater clearness. Fig. 3 is an assembly view illustrating one use of my invention. Like numerals of reference are employed to designate like parts in all the views.

Referring particularly to Fig. 3, I have shown the invention as applied to a standard pumping rig in which a pump rod 1 is reciprocated within the well, the upper end of the casing being shown at 2. The pump rod 1 is secured to the forward end of an ordinary walking beam 3, supported upon a Samson post 4 for a rocking movement. The beam 3 is operated through a pitman 5, connecting the end of the beam with a wrist pin 6 upon a crank arm 7, secured upon the crank shaft 8, said shaft being supported upon the jack post 9. A band wheel 10 upon the crank shaft provides for the transmission of power to the shaft.

In the position shown in Fig. 3, the crank arm is moving downwardly while the load upon the pump rod 1 is rising. The load of the rod is balanced by a weight 11 secured to the crank arm, as there shown, it being obvious that the dropping of the load is resisted by the weight 11. The particular construction and arrangement of this weight constitutes the subject of the invention. The crank arm employed upon the shaft is especially constructed for the use of this weight. As shown in Figs. 1 and 2, the crank arm is elongated to extend beyond the shaft on the side opposite the usual position of the arm and the body of the crank arm is preferably of an approximate oval shape. The crank arm proper has a series of openings 12 therein to receive the wrist pin 6 which may be secured in position in any one of the openings 12, depending upon the length of the stroke desired in the pumping equipment. The arm 7 is extended on the opposite side of the crank shaft 8 and an opening 12' is provided therein spaced from the shaft a distance equal to the first opening 12 in the crank arm proper.

The crank arm has adjacent the shaft an inwardly extending hub 13 which serves as a mounting for the weight 11. As seen in Fig. 2, the weight is provided with an opening to fit over the hub 13 and said weight may be secured rotatably in position upon the hub by means of a ring 14 on the inner end of the hub.

The weight is of approximately triangular shape, the outer side 15 thereof being curved on the arc of a circle having the shaft as a center. Said weight has a plurality of attaching means 16 thereon, and I have shown three of these attaching means, any one of which is provided with a series of openings 17 adapted to register with the openings 12 in the crank arm and to allow the passing therethrough of the wrist pin 6. A nut 18 upon the wrist pin serves to clamp the weight rigidly to the crank arm in any of the three positions indicated.

When in the position shown in full lines in Fig. 1 the weight 11 acts as a counterbalance for the load of the rods and plunger. It occasionally becomes necessary to detach the pump operating equipment from the crank arm and the shaft is then employed in operating a hoisting drum or other similar means in which the counterbalance is not needed. In such case, the weight may be swung upon the hub of the crank arm as a pivot into the dotted line position shown in Fig. 1 and the wrist pin 6 may be inserted through the openings 12' and 17 in the crank arm and weight respectively, securing the weight in the said dotted line position. In this position the weight balances the weight of the crank arm extending in the opposite direction and the two together act somewhat as a flywheel giving a more balanced action to the rotation of the crank shaft.

It will be noted that the weight may be adjusted to different positions upon the crankshaft relative to the load which is being operated. By moving the weight from its position centrally of the crank arm, as shown in Fig. 1, it may be moved so that the bulk of the weight extends to one side of the crank arm and in that position, with the wrist pin extending through the center of the openings 17 in the weight, the weight will have less effect in resisting the downward drop of the pump rods, and in this manner the effective resistance of the weight to the dropping of the pump rod may be adjusted with little difficulty.

The advantages of the construction lie in the ease with which the adjustments may be made. It will be obvious that the weight may hang by gravity from the shaft and the crank arm may be moved relative to the weight so as to register with any of the openings in the weight desired, and it will not be necessary at any time to raise the weight through means other than the crank shaft. The further advantages of this construction will be apparent to those skilled in the art.

What I claim as new and desire to protect by Letters Patent is:

1. In a device of the character described, a crankshaft, a crank arm thereon, said crank arm having unequal portions on opposite sides of said crankshaft, a weight adapted for rotation relative to said shaft, and means to secure said weight to said crank arm in either a balancing or a counterbalancing position.

2. In a device of the character described, a crankshaft, a crank arm thereon, a weight pivoted to swing circumferentially about said shaft and having a plurality of attaching openings therein, and means connected with said crank arm to secure said weight to said arm in various adjusted positions relative to said arm and said shaft.

3. In a device of the character described, a crankshaft, a crank arm extending radially therefrom, an opposite extending auxiliary arm, and a weight supported to swing circumferentially about said shaft and means whereby said weight may be secured to either of said arms for the purpose described.

4. In a device of the character described, a crankshaft, a crank arm extending radially therefrom, an oppositely extending auxiliary arm, said arms having pin receiving openings therein, a wrist pin on said crank arm, and a weight supported to swing about said shaft, and to be secured by said wrist pin in one of said openings to either of said arms for the purpose described.

5. In a device of the character described, a crankshaft, a crank arm extending radially therefrom, an oppositely extending auxiliary arm, a hub on said arms, a weight supported on said hub to swing about said shaft, and a pin to secure said weights to either of said arms for the purpose described.

6. In a device of the character described, a crankshaft, a crank arm thereon having a plurality of openings therein, a weight supported on said shaft to swing thereon, said weight having a plurality of openings adapted to register with openings in said arm, and a pin formed to extend through said weight and crank arm openings and secure said weight in various relative positions ahead of or behind said arm.

7. In a device of the character described, a crankshaft, a crank arm, a counterweight, a plurality of alignable openings in said arm and said weight, and a wrist pin adapted to connect the said arm and weight when passed thru said openings.

8. In a device of the character described, a crankshaft, a crank arm thereon, and a weight rotatable on said shaft and adapted to be secured to said crank arm at various radial positions relative to said shaft and to said arm.

9. An attachment for the crank arm of a pumping mechanism comprising a counterbalance weight structure, means for suspending said counterbalance weight structure from the crank shaft upon which said crank arm is mounted, means for attaching said counterbalance weight structure to said crank arm at a point other than its point of suspension from the crank shaft, said last two means being of such construction that said counterbalance weight structure may be so connected as to swing with said crank arm or may be so disconnected that said crank arm can move independently, said counterbalance attaching means comprising a plurality of connecting means disposed at spaced points along said counterbalance weight structure to permit said crank arm to be readily connected to said counterbalance weight structure at different points along the counterbalance weight structure.

10. An attachment for the crank shaft of an oil well pumping mechanism, comprising a crank arm with an opening therein, a weight structure having holes therein that are alignable with the opening in said crank arm, and means for securing said crank arm and said weight structure together.

11. An attachment for the crank shaft of an oil well pumping mechanism, comprising a pendulous weight structure having holes disposed about the face thereof, and a crank arm having an opening therein, said holes and said opening being alignable, and means for securing said holes in alignment with said opening.

12. A counterbalance attachment for well pumping mechanism comprising, in combination with a crank arm, a pendulous weight so mounted that it may be attached to said crank arm, and means for connecting said pendulous weight to said crank arm in such a manner that it will rotate therewith as a unit, said means being of such construction that the said pendulous weight may be entirely disconnected from said crank arm.

13. An attachment for the crank shaft of an oil pumping mechanism comprising a crank arm, a weight structure suspended from said crank shaft, said weight structure being movable on said crank shaft into position for connection to said crank arm and movable out of such position, and means for connecting said weight structure to said crank arm so that said weight structure and said crank arm will move as a unit.

14. In combination with a well pumping unit, a crankshaft, a crank arm thereon, a pendulous weight adapted for connection with said crankshaft, and means whereby said weight may be connected in either a leading or a trailing position with respect to said arm.

15. An attachment for the crank arm of an oil well drilling or pumping mechanism comprising a weight structure suspended from said crank arm, means for operatively connecting said crank arm and said weight structure by moving said weight structure to lead, coincide or trail the longitudinal axis of said crank arm.

16. A counterbalance attachment for an oil pumping mechanism comprising, in combination with a crank arm, a pendulous weight so mounted that it may be attached to said crank arm, and interfitting means for connecting said pendulous weight to such crank arm in such a manner that it will rotate therewith as a unit, said means being of such construction that said pendulous weight may be entirely disconnected from said crank arm.

WALTER C. TROUT.